United States Patent Office.

FRIEDRICH WILHELM WENDENBURG, OF BAGENZ, PRUSSIA, GERMANY.

PREPARING FOOD FOR ANIMALS.

SPECIFICATION forming part of Letters Patent No. 389,271, dated September 11, 1888.

Application filed July 8, 1886. Serial No. 207,440. (No specimens.) Patented in Germany March 11, 1886, No. 39,428; in Belgium March 25, 1886, No. 72,504; in Sweden April 3, 1886, No. 1,199; in England April 10, 1886, No. 4,989; in Canada July 21, 1886, and in Finland October 1, 1886, No. 264.

*To all whom it may concern:*

Be it known that I, FRIEDRICH WILHELM WENDENBURG, of the town of Bagenz, in the Kingdom of Prussia and German Empire, have invented certain new and useful Improvements in Processes for Manufacturing Food for Cattle and other Animals from Wood Meal or Powder, (for which said invention I have obtained patents in Germany, dated March 11, 1886, No. 39,428; in Finland, dated October 1, 1886, No. 264; in England, dated April 10, 1886, No. 4,989; in Belgium, dated March 25, 1886, No. 72,504; in Sweden, dated April 3, 1886, No. 1,199, and for which an application was filed in Canada on July 21, 1886, the Letters Patent and official number for which are not yet issued,) of which I declare the following to be a specification.

My invention relates to an improved process for manufacturing food for cattle and other animals from wood meal or powder, which said food can be employed in a wet state or can be baked and formed into cakes of suitable size and form.

It is well known that wood is very difficult to digest. The nutritive properties contained in the same can only then be utilized when the said wood has been opened up by being subjected to the action of chemicals calculated to attain the said object. It is true that wood, and especially the bark of trees, possesses nutritive properties, which is proved by the fact that horses, deer, and other animals eat the bark and wood of trees with avidity; but the most nutritious parts of the same can only be made available by separating or opening up the same by means of appropriate chemicals.

Now, I prepare wood in a simple, economical manner, and produce a nutritious food for animals therefrom by rendering said wood readily digestible, as will be found by the following analysis: for instance one hundred parts, by weight, of dried material containing proteine, 4.9; fat, 1.4; soluble non-nitrogenous matter, 36.0; wood-fiber, 50.0; ash, 7.7.

It will be evident from the foregoing that a very cheap alimentary substance is produced, and at the same time food for cattle, which can be attained at all times of the year and in every country, it being so cheap that it is within the reach of the smallest cattle owner.

In order to carry my said invention into effect, the wood of beech, birch, lime, acacia, or other trees is reduced to a fine powder or meal by means of any appropriate machine, the construction of which it is not necessary to describe, as various kinds of constructions can be employed with like good effect. This fine meal or wood powder is now mixed with common salt in the proportion of three pounds of salt to every hundred pounds of wood meal or powder. An appropriate quantity of scalding-hot or heated water, waste lye from distilleries, or its equivalent, to which muriatic acid, of about one-eighth per cent. in weight of the lye or water, has been previously added, is now intimately mixed with the mixture of wood meal or powder and salt and well stirred, until a very thin pulp-like mass is produced, which is allowed to stand for about six hours. After this said mixture has remained standing, as aforesaid, for about six hours, soda dissolved in water is added to the mass, in the proportion of about one-eighth per cent. of the weight of the wood meal or powder employed, and then the entire mass thoroughly stirred, adding at the same time a small quantity of chloride of lime, and after the said mass is intimately mixed the same is allowed to stand for about six hours, after which the said mass can be employed for feeding cattle or other animals.

If it is desired to form the mass or compound above described into bread or cakes, I prefer to add to the same a mineral salt—such as phosphite of lime or bicarbonate of soda—with an addition of chloride of calcium instead of chloride of lime alone. To the so-prepared meal or mass I now add about one per cent., by weight, of salt, and mix the whole with a suitable quantity of flour, bruised grain, bran, or flour or meal from oily grains or fruits, such as rape, and so on. This mass is now mixed with a weak slightly-colored lime-water, or milk of lime and yeast, leaven, or their equivalents, and kneaded into dough, which can be baked, pressed, or roasted.

The proportion of grain-meal and other matter to the wood-meal must be varied according to circumstances—that is, whether the same is to be employed for feeding young animals, milch-cows, or working-animals. For each one hundred pounds of meal I prefer to employ about twenty to twenty-five pounds of milk of lime, of about one-fifth to one-sixth per cent. strength.

My improved meal can also be provided with leaven, kneaded or trodden hard or firm, allowed to come to fermentation by self-heating, and can then be used as food.

Wood-meal mixed with sweet sour-mash is especially adapted for feeding milk-giving cows. For this purpose a mash of potatoes and malt is made, which, after the conversion of the starch into sugar—i. e., after about eight hours—will have a sweet-soury flavor. So much hot water is now added to the mash that the wood-meal which is to serve as food is like a thick pulp, which, after standing for about an hour, is eaten by cattle with great avidity.

It will be evident from the foregoing that the proportions of the component parts of my improved food for cattle can be modified in various manners without in any way departing from the tenor of my said invention.

Having now particularly described and ascertained the nature of my said invention and the manner of carrying the same into effect, I declare that what I claim is—

1. The process, substantially as described, for manufacturing food for cattle, which consists in reducing wood to fine powder, mixing this powder with three per cent. of its weight of common salt, then adding hot liquor containing one-eighth per cent. of hydrochloric acid, and allowing the so-prepared mass to stand for about six hours before use.

2. The process, substantially as described, for manufacturing food for cattle, consisting in reducing wood to fine powder, mixing this powder with three per cent. of its common salt, adding hot liquor containing one-eighth per cent. of hydrochloric acid, then adding a solution of soda in water and chloride of calcium, and allowing the so-prepared mass to stand a suitable time before use.

3. The process, substantially as described, for manufacturing food for cattle, consisting in reducing wood to fine powder, mixing the same with three per cent. in weight of common salt, adding hot liquor containing one-eighth per cent. hydrochloric acid, adding a solution of soda and chloride of lime, then adding phosphate of lime, chloride of calcium, and about one per cent. of salt, said mass being well mixed with a quantity of cereal matter, milk of lime, and a ferment, kneaded into dough, and made up into loaves for being baked.

4. The process, substantially as described, for manufacturing food for cattle, which consists in reducing wood to fine powder, treating this powder with solutions of salts and hydrochloric acid, mixing the mass with a quantity of cereal matter and a ferment, and making the same into loaves for baking.

In witness whereof I have hereunto signed my name in the presence of two subscribing witnesses.

FRIEDRICH WILHELM WENDENBURG.

Witnesses:
 B. ROI,
 A. STEFFEN.